United States Patent
Ramagnano et al.

(10) Patent No.: US 10,760,633 B2
(45) Date of Patent: Sep. 1, 2020

(54) METHOD AND DEVICE FOR DETERMINING WEAR OF A CARBON CERAMIC BRAKE DISC IN A VEHICLE BY IMPEDANCE MEASUREMENTS

(71) Applicant: PROCEQ SA, Schwerzenbach (CH)

(72) Inventors: Nicola Ramagnano, Rapperswil (CH); Johannes Hoffmann, Bern (CH); Alessandro Mortara, Fribourg (CH)

(73) Assignee: PROCEQ SA, Schwerzenbach (CH)

( * ) Notice: Subject to any disclaimer, the term of this patent is extended or adjusted under 35 U.S.C. 154(b) by 327 days.

(21) Appl. No.: 15/743,821

(22) PCT Filed: Jul. 13, 2015

(86) PCT No.: PCT/CH2015/000105
§ 371 (c)(1),
(2) Date: Jan. 11, 2018

(87) PCT Pub. No.: WO2017/008172
PCT Pub. Date: Jan. 19, 2017

(65) Prior Publication Data
US 2019/0003542 A1    Jan. 3, 2019

(51) Int. Cl.
*F16D 66/02* (2006.01)
*G01N 27/02* (2006.01)
(Continued)

(52) U.S. Cl.
CPC ............ *F16D 66/027* (2013.01); *B60T 17/22* (2013.01); *F16D 66/028* (2013.01);
(Continued)

(58) Field of Classification Search
CPC ................. F16D 66/027; F16D 66/028; F16D 2200/0047; G01N 27/023
See application file for complete search history.

(56) References Cited

U.S. PATENT DOCUMENTS 3,764,897 A * 10/1973 Greenwood ........... G01B 7/107
324/229
5,028,100 A    7/1991 Valleua et al.
(Continued)

FOREIGN PATENT DOCUMENTS

DE    10 2008 051 802    4/2010
EP    1 387 166    2/2004
(Continued)

OTHER PUBLICATIONS

Japan Notice of Reasons for Rejection conducted in counterpart Japan Appln. No. 2018-501290 (dated Jul. 23, 2019) (w/ English language translation).
(Continued)

*Primary Examiner* — Jennifer E Simmons
(74) *Attorney, Agent, or Firm* — Greenblum & Bernstein, P.L.C.

(57) ABSTRACT

A quality value for a carbon ceramic brake disc (2) in a vehicle is measured by means of a measuring device (3) installed in the vehicle. The measuring device (3) with a coil (10) is located at a distance (d) from the brake disc (2) in order avoid direct physical contact with the brake disc. The impedance of the coil (10) is measured for at least two frequencies. The resulting measurement values that correlate to impedance values are introduced into a mathematical model in order to eliminate the dependence of the unknown distance (d) and to obtain a quality value dependent on the conductivity of the brake disc (2).

15 Claims, 3 Drawing Sheets

(51) Int. Cl.
 *G01N 27/90* (2006.01)
 *B60T 17/22* (2006.01)

(52) U.S. Cl.
 CPC ....... *G01N 27/023* (2013.01); *G01N 27/9046* (2013.01); *F16D 2200/0047* (2013.01)

(56) References Cited

U.S. PATENT DOCUMENTS

| | | |
|---|---|---|
| 6,188,218 B1 | 2/2001 | Goldfine et al. |
| 7,309,609 B2 | 12/2007 | Christ et al. |
| 9,091,663 B2 | 7/2015 | Brandestini et al. |
| 2003/0071614 A1 | 4/2003 | Buttle |
| 2005/0017713 A1 | 1/2005 | Goldfine et al. |
| 2013/0015849 A1 | 1/2013 | Brandestini et al. |

FOREIGN PATENT DOCUMENTS

| | | |
|---|---|---|
| JP | 2008-57677 | 3/2008 |
| JP | 2013-19539 | 1/2013 |

OTHER PUBLICATIONS

Dodd, V.C. et al., "Analytical Solutions to EddyCurent Probe-Coil Problems", Journal of Applied Physics, vol. 39, No. 6, May 1968, pp. 2829-2838.
Dodd, C.V. et al., "Some eddy-current problems and their integral solutions", ORNL-4384, ORNL, Oak Ridge National Laboratory, Apr. 1969, PP.
Press et al., "Numerical Recipes 3rd Edition: The Art of Scientific Computing", ISBN-13: 978-0521880688, Section 15.
Official Communication issued in International Bureau of WIPO Patent Application No. PCT/CH2015/000105, dated Mar. 18, 2016.

\* cited by examiner

METHOD AND DEVICE FOR DETERMINING WEAR OF A CARBON CERAMIC BRAKE DISC IN A VEHICLE BY IMPEDANCE MEASUREMENTS

TECHNICAL FIELD

The invention relates to a method for determining wear of a carbon ceramic brake disc in a vehicle as well as to a device for carrying out this method and a vehicle with such a device.

BACKGROUND ART

A "carbon ceramic brake disc" is a brake disc comprising a carbon ceramic material, wherein the carbon ceramic material comprises a ceramic matrix as well as carbon fibers embedded in the matrix.

In such carbon ceramic brake discs an oxidation of the carbon fibers and therefore wear occurs due to high operating temperatures. This wear cannot be reliably recognized by mere optical inspection. An improved recognition of wear is achieved by inductive methods of measurement. The principle used in this type of measurements is based on eddy current damping; either using two coils (EP 1 387 166) operating continuously, or one or two coils in pulsed operation (DE 10 2008 051 802). In these documents, the excellent correlation between the inductive measurement and a gravimetric determination of the wear is disclosed. A conventionally traded Profometer (www.proceq.com) is used as measuring device. Using this type of techniques, it is not necessary to disassemble the brake disc for measurement.

US 2013/0015849 describes a method for measuring the wear of a carbon ceramic brake disc, where a housing holding a plurality of coils is held against the brake disc.

All these techniques, which are based on determining a quality value dependent on the inductance of the brake disc, are designed for offline measurements where the measuring device is not permanently built into the vehicle, e.g. for measurements at a garage, where the vehicle is at rest, or for measurements of brake discs outside a vehicle. The measuring device is brought into physical contact with the brake disc and a parameter depending on the impedance of the coil(s) is measured.

It is found that this type of measuring device is poorly suited for being a permanent installation in the vehicle.

DISCLOSURE OF THE INVENTION

The problem to be solved by the present invention is to provide a method of the type above that is better suited for being used with a device that is permanently installed in the vehicle, as well as a measurement device of this type.

This problem is solved by the method and device of the independent claims. Accordingly, a method and device for determining the wear of a carbon ceramic brake disc in a vehicle by obtaining a quality value depending on the conductivity s of the brake disc are presented.

According to the invention, the following steps are taken, typically by a control unit of the device that contains suitable hard- and firmware:

Applying a voltage to an (electromagnetic) coil having an impedance Z, with said coil being at a distance d from said brake disc;

Performing measurements of a parameter P that is a function of the impedance Z of the coil, of the distance d between coil and brake disc, and of the conductivity s of the brake disc. By means of these measurements, values Pi of said parameter P are measured at N frequencies fi with i=1 to N and N>1. The frequencies fi are frequencies or frequency components of the voltage applied to the coil, and they are different from each other.

Fitting a mathematical model describing parameter P as a function of the frequencies fi, distance d and conductivity s to said measurements by varying distance d and conductivity s. In this context, the term "fitting" describes any algorithm or method that at least approximately solves the system of equations for P that has been created by the measurements.

Deriving the quality value M from a value of said conductivity s as obtained from fitting the mathematical model.

The invention is based on a number of insights, in particular:

First, it has been found that the distance d between the coil and the brake disc strongly affects the impedance Z of the coil.

Second, it has been found that trying to make sure that this distance d is kept constant and/or is known is difficult for a device permanently installed in a vehicle.

Third, the invention is based on the understanding that the impedance is not only a function of the distance, but also of the frequency f of the applied voltage, and that the dependencies of the parameter P on distance d as well as on frequency f are different, which allows to eliminate (or at least strongly decrease) the dependence of the measurement on distance d by numerically and/or mathematically combining measurements at different frequencies.

In an advantageous embodiment, the method comprises at least N subsequent steps of applying said voltage at frequency fi to said coil and measuring said value Pi of said parameter, for i=1 to N. Alternatively, a voltage pulse that contains spectral components at the frequencies fi is applied to the coil, and the response of the coil is analyzed, e.g. using spectral analysis, in order to determine the values Pi.

The invention also relates to a vehicle comprising such a device and at least one brake disc monitored by the device.

BRIEF DESCRIPTION OF THE DRAWINGS

The invention will be better understood and objects other than those set forth above will become apparent when consideration is given to the following detailed description thereof. This description makes reference to the annexed drawings, wherein.

MODES FOR CARRYING OUT THE INVENTION

Figure 1:
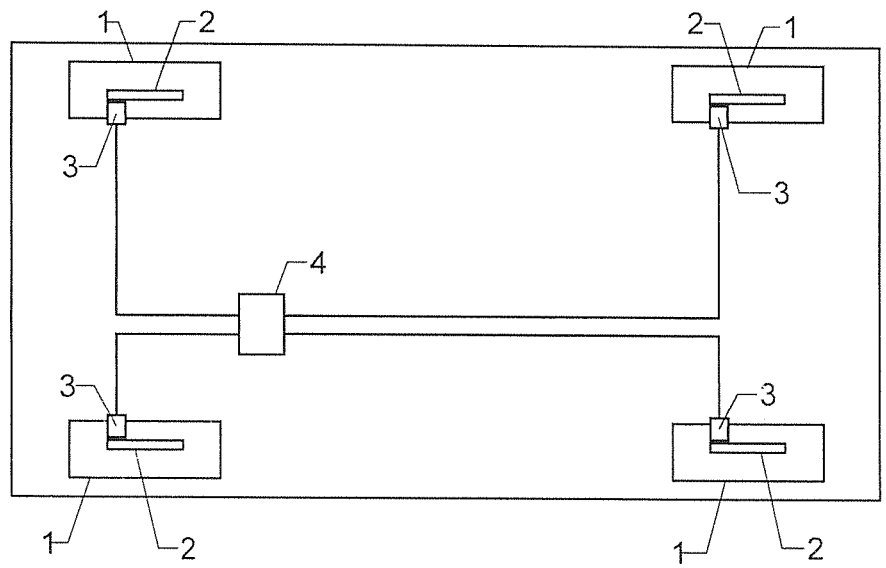
FIG. 1 shows a schematic top view of a vehicle with devices for monitoring the brake discs.

FIG. 1 schematically shows a vehicle, e.g. a car, with four wheels 1. Each wheel is provided with a brake disc 2. The brake discs are carbon ceramic brake discs.

A measuring device 3 is located at each brake disc 2. Its purpose is to measure the quality of the brake disc, and in particular a quality value M that depends on the conductivity of the material in the brake disc. This quality value allows, as explained above, to assess the state of decomposition of the carbon fibers in the ceramic matrix.

All measuring devices 3 are e.g. connected to a common central monitoring unit 4, which can, for example, be adapted to show a status message on the dashboard of the vehicle.

Figure 2:
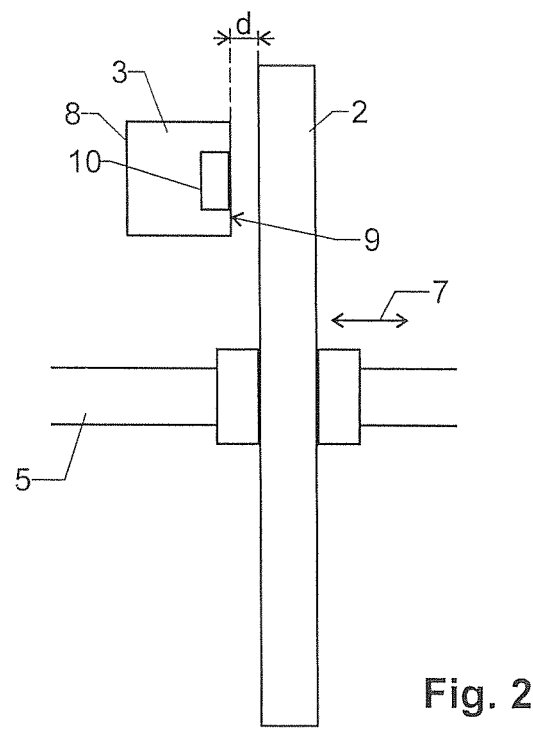
FIG. 2 shows a brake disc and its associated measuring device.

FIG. 2 shows a view of a single brake disc 2 with its associated measuring device 3. As can be seen, brake disc 2 is mounted on an axle 5.

Measuring device 3 comprises a housing 8 enclosing the components therein. In this context, the term "housing" should be interpreted broadly as the physical outer surface of the measuring device. Housing 8 is located at the distance d from brake disc 2 in order to avoid a physical contact between the measuring device and the disc when the disc is rotating. Distance d is advantageously at least 5 mm along axial direction 7, but should advantageously not be more than 20 mm.

Measuring device 3 comprises a coil 10. In the embodiment shown in FIG. 2, coil 10 is located immediately at a first side 9 of housing 8, which is the side that faces brake disc 2. Coil 10 is positioned at distance d from brake disc 2, i.e. there is a spacing of at least that distance d between the brake disc 2 and coil 10.

Figure 3:
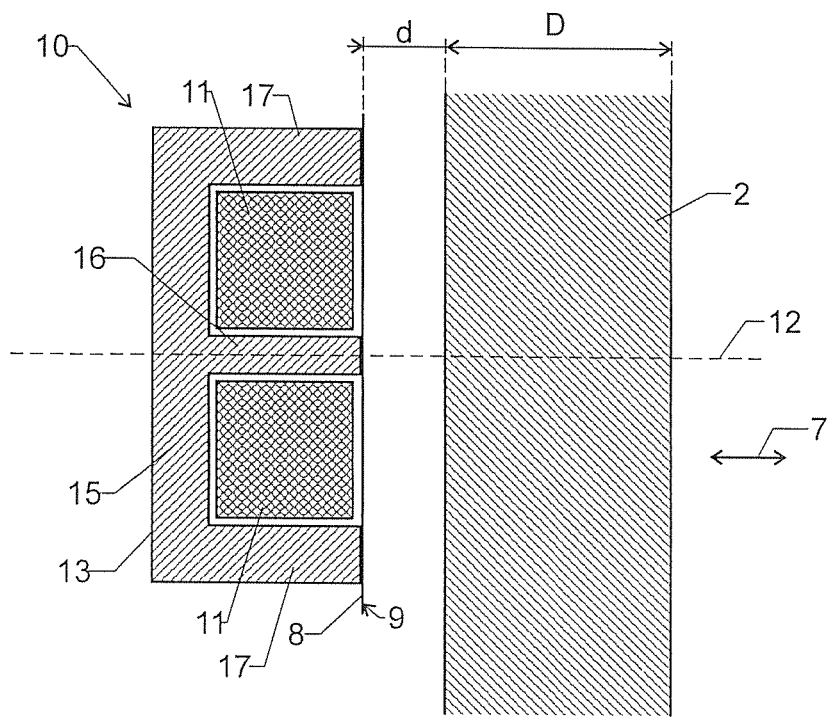
FIG. 3 is a sectional view the coil and the brake disc.

FIG. 3 shows a sectional view of coil 10 and its adjacent brake disc 2. Coil 10 comprises a coil body 11 consisting of wires wound around a coil axis 12, with coil axis 12 extending perpendicularly to the surface of brake disc 2 and parallel to axial direction 7.

In the embodiment of FIG. 3, coil body 11 is (optionally) embedded in a ferrite body 13. Ferrite body 13 forms backplane 15 that extends over the side of coil 11 that faces away from first side 9 of housing 8. It further forms a central core 16 that axially extends through coil body 11 as well as an annular shield 17 that is located radially outside coil body 11.

Ferrite body 13 does not cover coil 10 at first side 9. This design of ferrite body 15 spatially restricts the magnetic field lines on the side of coil 10 that is opposite to first side 9, while it allows the field lines to extend freely towards brake disc 2.

Figure 4:
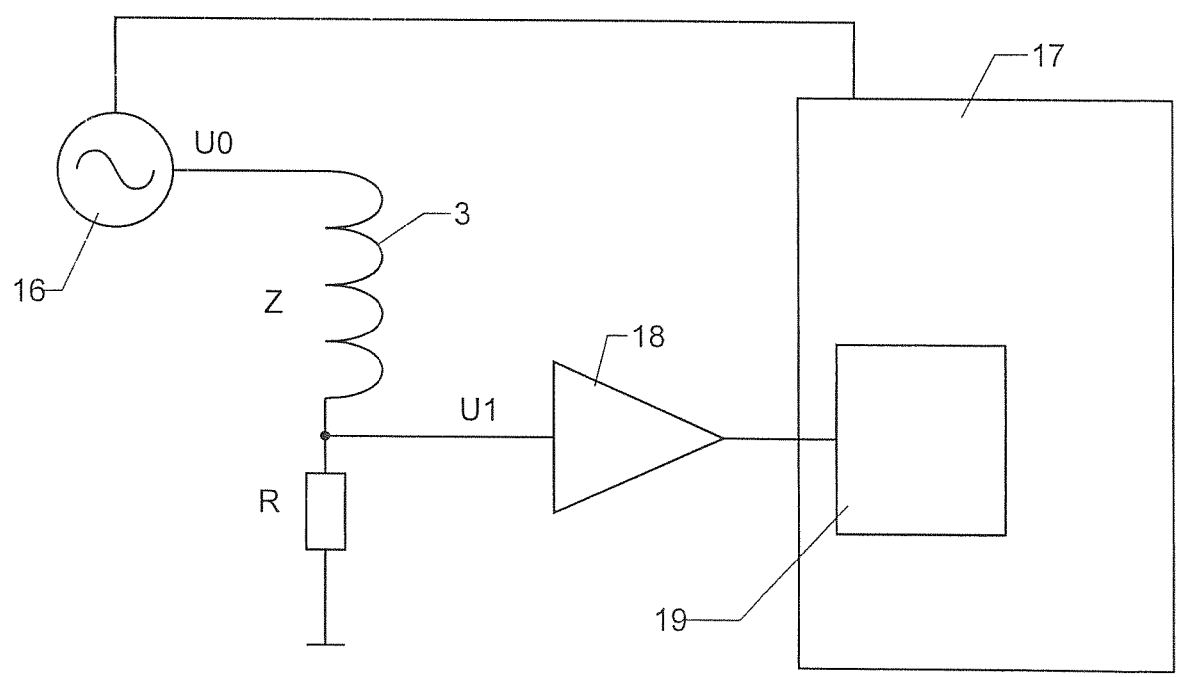
FIG. 4 is a block circuit diagram of a measuring device.

FIG. 4 shows a schematic block diagram of an embodiment of the measuring device.

As can be seen, the measuring device comprises a signal generator 16. In the embodiment shown here, signal generator 16 is a VCO (voltage controlled oscillator), whose frequency is controlled by a control unit 17. Alternatively, signal generator 16 can e.g. be a software-designed signal generator.

Control unit 17 can e.g. at least in part be located in housing 8 of measuring device 3 and/or it can at least in part be located in central monitoring unit 4.

The voltage U0 generated by signal generator 16 is fed to one terminal of coil 10, while the other terminal is connected to ground or a reference potential via a resistor R.

The voltage over resistor R is amplified and filtered by an amplifier 18 and fed to an analyzing section 19 of control unit 17, which may be implemented in hard- and/or software.

The voltage drop U1 over resistor R depends on the impedance Z of coil 10, which means that the impedance Z, or a parameter P dependent thereon, in particular a parameter linearly dependent thereon, can be measured by the analyzing section 19.

Impedance Z, and therefore parameter P, are functions of the following values:
the distance d between coil 10 and brake disc 2,
the thickness D of brake disc 2,
the conductivity s of brake disc 2, and
the frequency f of the voltage over coil 10.

Impedance Z, and therefore parameter P, depend on further parameters, such as the coil geometry, which are not of interest in the present case because they are known and/or do not change between measurements.

An analytical formula for the impedance Z(d, D, s, f) for a coil without ferrite body can be found in the following references:

Ref. 1: Dodd, C. V.; Deeds, W. E., "Analytical Solutions to Eddy-Current Probe-Coil Problems", Journal of Applied Physics, vol. 39, no. 6, pp. 2829-2838, May 1968.

Ref. 2: Dodd, C. V.; Deeds, W. E.; Luquire J. W.; Spoeri W. G., \Some eddy-current problems and their integral solutions", ORNL-4384; ORNL, Oak Ridge National Laboratory, April 1969.

An example for Z(d, D, s, f) is given in Eq. 3.49 of Ref. 2.

For other coil geometries, e.g. for a coil with a ferrite core, the impedance Z is also a function of the same parameters d, D, s, f, and Z can be calculated from these parameters by using a simulation based on the finite element method (FEM). Similarly, the parameter P measured by control unit 17 is also a function of the parameters d, D, s, f.

Control unit 17 can be adapted to measure parameter Z directly from using $$P = Z = R \cdot \frac{U0 - U1}{U1}, \qquad (1)$$

with U0 being the known voltage at the output of signal generator 16 and U1 being the voltage at the input of amplifier 18, both of which are complex values (for encoding the phase shifts of the voltages) for a sinusoidal voltage at a frequency f.

In more general cases, e.g. if the amplification factor of amplifier 18 is not known exactly, the measured parameter P will not be equal to the impedance Z, but it will a monotonous function thereof, and advantageously be proportional thereof.

The parameter of interest in P(d, D, s, f) is the conductivity s of brake disc 2 since, as discussed above, it provides information on the quality of the brake disc. The thickness D of brake disc 2 and the frequency f are well known. However, the distance d between coil 10 and brake disc 2 is not known with good accuracy, in particular because there are typically substantial positioning tolerances along axial direction 7 between the vehicle's chassis and the position of break disc 2.

As can be seen from Eq. 3.49 of Ref. 2, the impedance of coil 10 depends in different ways from the distance d and the conductivity s. Therefore, by at least measuring a first value P1 of parameter P at a first frequency f1 and a second value P2 of parameter P at a second frequency f2, a system of equations is obtained $$P1 = P(d, D, s, f1)$$

$$P2=P(d,D,s,f2) \quad (2)$$

which can be solved for the unknown conductivity s even if distance d is not known exactly.

Function P in Eqs. (2) is a mathematical model describing parameter P as a function of distance d, conductivity s and frequencies f1. It may be known analytically, at least in approximation, or it can be obtained in numerical form, e.g. from finite element field calculations.

Eqs. (2) may be solved analytically (if P(d, D, s, f) is known in analytical form and the system of equations can be solved in analytical form) or, more typically, Eqs. (2) are be solved numerically e.g. using a root finder algorithm.

However, advantageously, more than two measurements for more than two different frequencies are made. Hence, in more general form, a series of measurements $$Pi=P(d,D,s,fi), \quad (3)$$

with i=1 ... N, N>1, in particular N>2, is made. The usually overdetermined system of equations (3) can be solved using fitting techniques, in particular minimization techniques and/or regression analysis. Such techniques are known to the skilled person and e.g. described in Press et al., "Numerical Recipes 3rd Edition: The Art of Scientific Computing", ISBN-13: 978-0521880688, Section 15.

Figure 5:
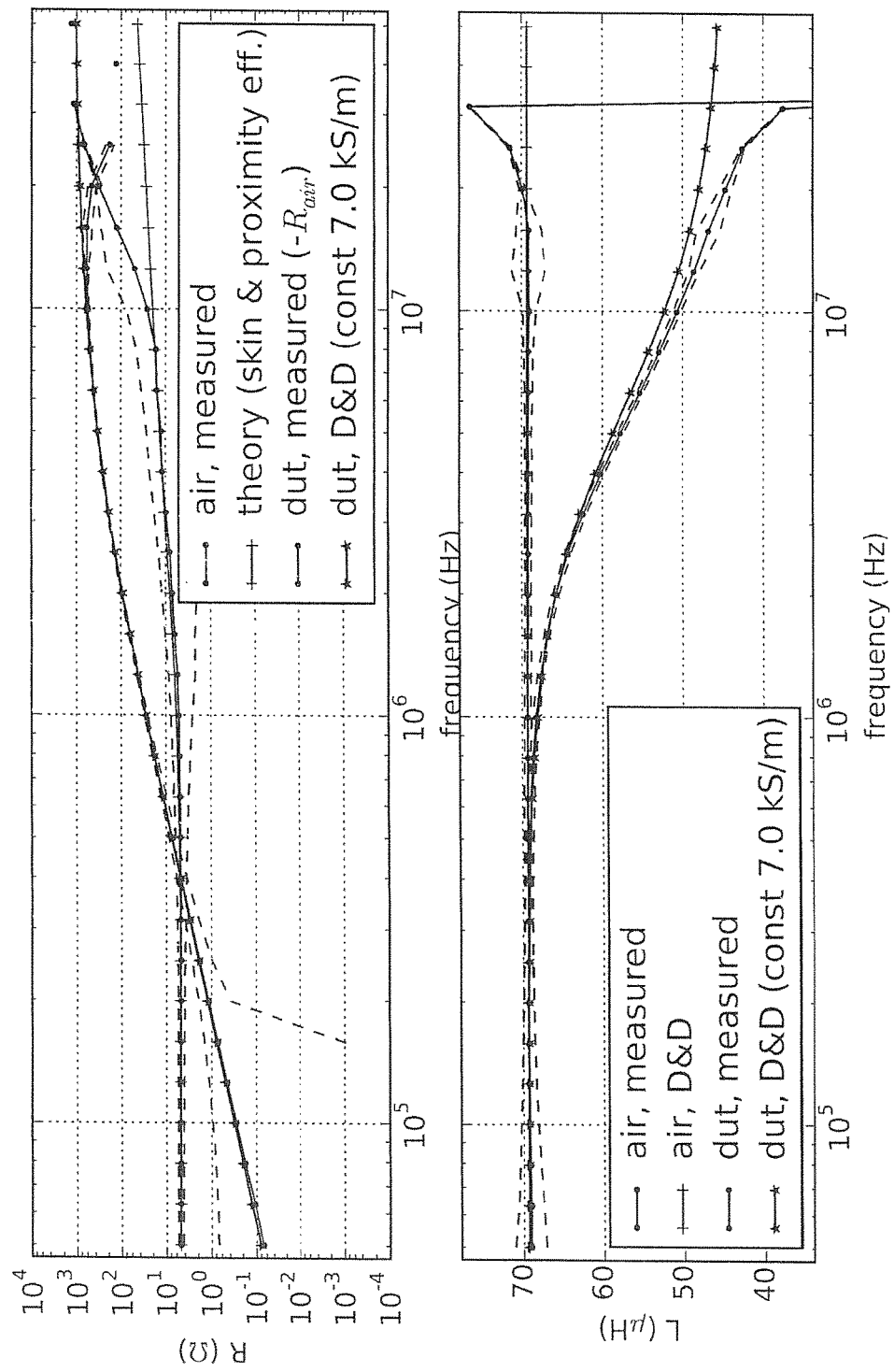
FIG. 5 shows the resistance and the inductance of the coil under various conditions as a function of frequency.

FIG. 5 shows the real and imaginary parts R and L of the impedance Z of a coil (without ferrite core) as a function of frequency f. Measurements were made for a setup without a brake disc near the coil ("air"), and for a setup with the coil being close to a brake disc ("dut"). For both cases, the theoretical resistance and inductivity values (as obtained from the formulas in Refs. 1 and 2) are plotted, as well as the measured values. As can be seen, the curves match well for frequencies sufficiently below the resonance frequency of the coil.

It must be noted, at this point, that no exact, absolute knowledge of conductivity s is required for assessing the quality of brake disc 2. Rather, any quality value M dependent on—advantageously monotonously dependent on, in particular proportional to—conductivity s can be used. For example, quality value M can be equal to conductivity s or be proportional to conductivity s, i.e.

$$M=k \cdot s, \quad (4)$$

with k not being zero, e.g. 1.

In more general terms, therefore, the present method comprises the following steps:

Providing a mathematical model describing parameter P as a function of distance d and conductivity s: As mentioned above, this can e.g. be an analytical model, such as described in Refs. 1 and 2 mentioned above. It may also be a numerical model, which can e.g. be based on finite element calculus or on a series of calibration measurements for known frequencies f, conductivities s and distances d. A numerical model can e.g. be stored in control unit 17 as a multi-dimensional lookup-table and be accessed using an interpolation algorithm.

Fitting the model to the measured parameter values P1, P2 or, more generally, Pi, by varying distance d and conductivity s. In other words, those values of distance d and conductivity s are searched that provide a "best solution" (e.g. in the sense of a minimum sum of least squares deviations) of Eqs. (2) or (3), respectively.

Deriving the quality value M as a function of a value of the conductivity s from fitting the model. Hence, the quality value M can e.g. be equal to conductivity s, be proportional to conductivity s as described by Eq. (4), or be differently dependent, in particular monotonously dependent, on conductivity s.

By solving Eqs. (2) or (3), a quality value M can be obtained that has a much weaker dependence on the unknown distance d. The robustness of quality value M towards errors or variations in distance d can be expressed by a ratio $R_M$:

$$R_M = \left| \frac{\left(\frac{1}{M} \cdot \frac{\partial M}{\partial d}\right)}{\left(\frac{1}{M} \cdot \frac{\partial M}{\partial s}\right)} \right|, \quad (5)$$

In order to have a quality value M that is robust towards errors in distance d, $R_M$ is advantageously smaller than 0.1.

If the quality of the model used in Eqs. (3) is perfect, ratio $R_M$ should be zero. However, in most cases, the model will be an approximation and therefore ratio $R_M$ may be larger than zero.

Notes

In the embodiments above, the measurement comprises subsequent steps of applying a voltage with the first frequency f1 to coil 10 and measuring the first value P1 of parameter P and applying a voltage of the second frequency f2 to coil 10 and measuring the second value P2 of parameter P.

This is continued for all N frequencies. In other words, the measurement is carried out in the frequency domain.

Alternatively, the measurement can be carried out in the time domain. In this case, signal generator 16 can be adapted to generate a voltage pulse that has spectral components at all frequencies f1, f2 (or, more general, fi for i=1 ... N) of interest. This voltage pulse is applied to coil 10, and the current through coil 10 (or, equivalently, the voltage over resistor R) is measured as a function of time. As known to the skilled person, this allows to determine the frequency components of the impedance Z of coil 10 using spectral analysis, such as FFT techniques.

The formula given for the impedance Z of coil 10 as given in Refs. 1 and 2 holds true when brake disc 2 is at rest. However, when brake disc 2 rotates, additional eddy currents are generated in the material of brake disc 2, which lead to deviations from the theory.

Hence, in an advantageous embodiment, the measurements are carried out while bake disc 2 is at rest, i.e. when the deviations (between the measured conductivity s and the conductivity as obtained from the theoretical model) caused by the motion of brake disc 2 are negligible.

Alternatively, a model for the impedance Z or the parameter P can be used that takes the rotation of the brake disc into account, which allows to perform measurements while the vehicle is moving at speed.

The frequencies fi to be used in the measurements should advantageously be at least 0.5 MHz because lower frequencies lead to magnetic fields that tend to extend beyond brake disc 2, thereby making the measured quality value M more dependent on components behind the disc.

On the other hand and for the reason mentioned above, the frequencies fi should be below the resonance frequency of the coil, which is, for typical coils, at 15 MHz or more. Hence, the frequencies fi are advantageously smaller than 15 MHz.

In addition, the frequencies fi should be selected to be even smaller than that if it is desired for the field to enter deeply into brake disc 2 in order to measure its bulk properties. In order to have a penetration depth of at least around 1 cm, the frequencies fi should be smaller than 3 MHz.

The device described here can be fixedly installed into a vehicle and remain therein during operation of the vehicle. As mentioned above, the measurements can be carried out while the vehicle is at rest, but also (if a suitable model for the impedance is used) when the vehicle is running.

The vehicle can e.g. be a car, a utility vehicle or a bike. If it has more than one brake disc, which is generally the case for this kind of vehicles, at least one measuring device can be attributed to each of its brake discs in order to monitor all of them.

In the embodiment of FIG. 1, one measuring device is attributed to each brake disc. However, there may be fewer measuring devices than brake discs in a given vehicle, e.g. only one measuring device per vehicle or only one measuring device per axle, in which case only a subset of the brake discs is monitored, assuming that all break discs in a vehicle or on an axis are subject to comparable wear and aging.

All the steps for carrying out the method described therein can be controlled by and implemented in hard and software within control unit 17 of the device.

While there are shown and described presently preferred embodiments of the invention, it is to be distinctly understood that the invention is not limited thereto but may be otherwise variously embodied and practiced within the scope of the following claims.

The invention claimed is:

1. A method for determining a wear-dependent quality value M of a carbon ceramic brake disc in a vehicle, wherein said quality value M depends monotonously on a conductivity s of said brake disc, said method comprising:
   applying a voltage to a coil having an impedance Z, with said coil being at a distance d from said brake disc,
   performing measurements of a parameter P that is a function of said impedance Z, said distance d and said conductivity s, wherein values Pi of said parameter P are measured at N different frequencies fi with i=1 to N and N>1, and
   fitting a mathematical model describing said parameter P as a function of said frequencies fi, said distance d and said conductivity s to said measurements by varying said distance d and said conductivity s, and
   deriving said quality value M from a value of said conductivity s as obtained from fitting said mathematical model.

2. The method of claim 1 wherein a robustness $R_M$ of said quality value M towards errors or variations in distance d as defined by $$R_M = \left|\frac{\left(\frac{1}{M} \cdot \frac{\partial M}{\partial d}\right)}{\left(\frac{1}{M} \cdot \frac{\partial M}{\partial s}\right)}\right|$$

is smaller than 0.1.

3. The method of claim 1 wherein said coil is arranged in a housing and wherein a distance of said housing from said brake disc is at least 5 mm.

4. The method of claim 3, wherein said coil is arranged in a housing and wherein the distance of said housing from said brake disc is between 5 and 20 mm.

5. The method of claim 1 comprising the subsequent at least N steps of applying said voltage at frequency fi to said coil and measuring said value Pi of said parameter for i=1 to N.

6. The method of claim 1 comprising the steps of
   applying a voltage pulse having spectral components at all said frequencies fi for i=1 to N,
   measuring a response of a current through said coil as a function of time, and
   determining said values Pi of said parameter from said response of said coil.

7. The method of claim 1 wherein said measurements are carried out while said brake disc is at rest.

8. The method of claim 1 wherein said measurements are carried out while said brake disc is rotating.

9. The method of claim 1, wherein said frequencies are larger than 0.5 MHz and/or smaller than 15 MHz.

10. The method of claim 9, wherein said frequencies are larger than 0.5 MHz and/or smaller than 3 MHz.

11. The method of claim 1 wherein N>2.

12. A device for determining wear of a carbon ceramic brake disc in a vehicle by obtaining a quality value M depending on a conductivity s of said brake disc, said device comprising:
   a coil with an impedance Z and
   a control unit, wherein said control unit is structured and adapted to
      apply a voltage to said coil,
      perform measurements of a parameter P that is a function of said impedance Z, a distance d between said coil and said brake disc, and said conductivity s, wherein values Pi of said parameter P are measured at N different frequencies fi with i=1 to N and N>1, and
      fit a mathematical model describing said parameter P as a function of said frequencies fi, said distance d and said conductivity s to said measurements by varying said distance d and said conductivity s.

13. The device of claim 12 further comprising a ferrite body, wherein said device comprises a first side to be located facing said brake disc and wherein said ferrite body extends over a side of said coil opposite said first side, but does not cover said coil at said first side.

14. A vehicle comprising at least one brake disc and at least one device of claim 12 for monitoring said brake disc.

15. The vehicle of claim 14 having several brake discs and at least one said device attributed to each brake disc.

* * * * *